United States Patent
Chumley

(10) Patent No.: US 6,217,043 B1
(45) Date of Patent: *Apr. 17, 2001

(54) PORTABLE CART AND METHOD

(75) Inventor: Kenneth David Chumley, Woodruff, SC (US)

(73) Assignee: Reidville Products International, LLC, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/209,399

(22) Filed: Dec. 10, 1998

Related U.S. Application Data

(63) Continuation-in-part of application No. 08/908,738, filed on Aug. 7, 1997.

(51) Int. Cl.⁷ .................................................. B62B 1/00
(52) U.S. Cl. ......................... 280/40; 280/47.24; 280/655
(58) Field of Search .................. 280/19, 20, 40, 280/639, 42, 651, 652, 653, 655, 655.1, 47.17, 47.18, 47.19, 47.24, 47.26, 47.3, 47.31

(56) References Cited

U.S. PATENT DOCUMENTS

| | | | |
|---|---|---|---|
| 2,183,066 | * 12/1939 | Fields | 280/652 |
| 2,484,677 | * 10/1949 | Binz | 280/652 |
| 3,222,100 | * 12/1965 | Lindzy | 280/652 |
| 3,236,537 | * 2/1966 | Eckman | 280/652 |
| 4,789,180 | * 12/1988 | Bell | 280/47.26 X |
| 5,222,757 | * 6/1993 | Magyar | 280/653 |
| 5,330,212 | * 7/1994 | Gardner | 280/47.24 |
| 5,645,292 | * 7/1997 | McWilliams et al. | 280/47.24 X |
| 5,820,141 | * 10/1998 | Wilkerson et al. | 280/47.3 X |
| 5,887,879 | * 3/1999 | Chumley | 280/651 X |
| 5,903,997 | * 5/1999 | Jacob | 280/47.3 X |

\* cited by examiner

*Primary Examiner*—Brian L. Johnson
*Assistant Examiner*—Bryan Fischmann
(74) *Attorney, Agent, or Firm*—Ralph Bailey, P.A.

(57) ABSTRACT

A portable assembly is provided for compact storage and to facilitate portability wherein a body is constructed of longitudinal parallel transversely aligned tubular frame members (A) for telescopically positioning an extensible handle (B) with brackets (C) being moved for longitudinally sliding movement on longitudinal body members (A) for carrying wheels (D) which are locked in position opposite each other beneath a medial portion of the load utilizing fasteners (E) without the necessity for utilizing a transverse axle. A flexible or rigid platform support (F) may be utilized, and a transverse brace (G) may be removably secured to stabilize the wheels and their mountings during the transporting of a load.

14 Claims, 5 Drawing Sheets

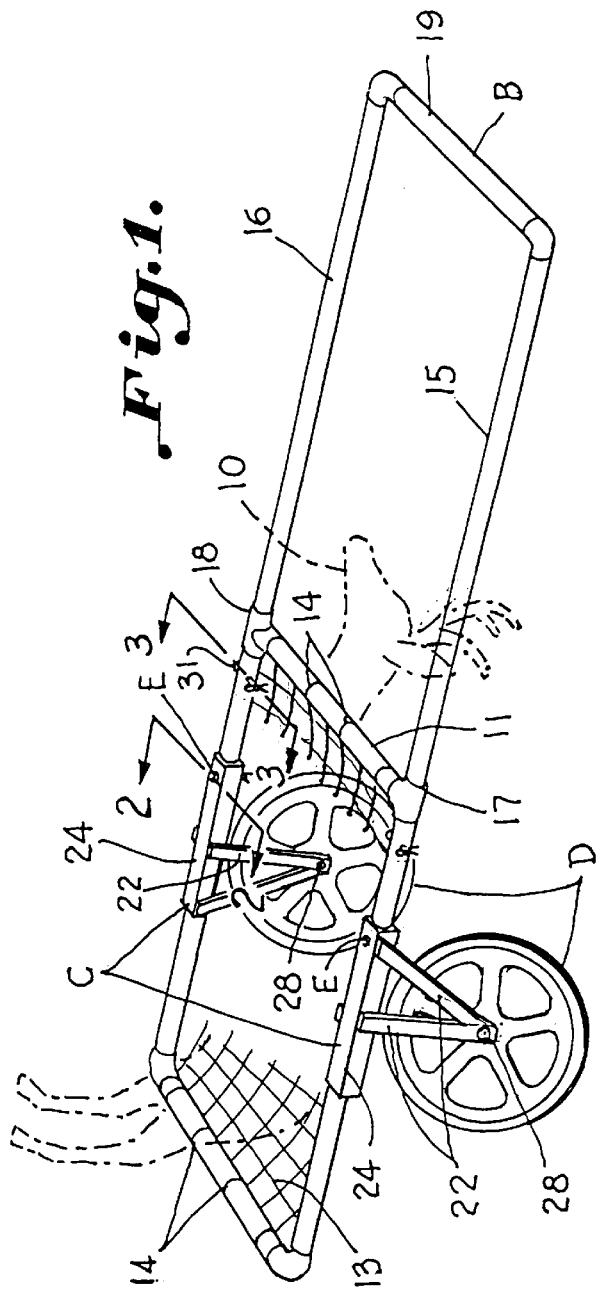
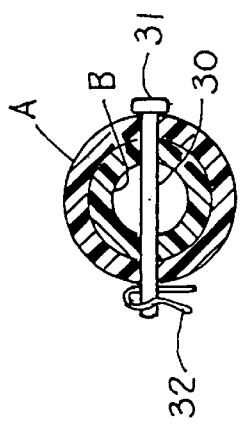
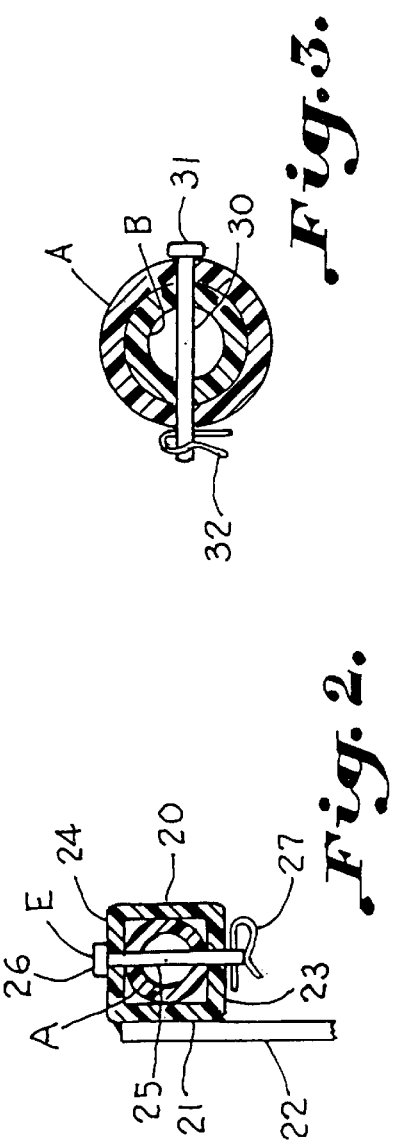

PORTABLE CART AND METHOD

This is a continuation-in-part of my copending application entitled CART ASSEMBLY AND METHOD Ser. No. 08/908,738, filed Aug. 7, 1997.

BACKGROUND OF THE INVENTION

This invention relates to a load bearing cart which is collapsible into a compact package which is light and conveniently carried. The cot may be readily reassembled.

The prior art includes U.S. Pat. No. 4,063,744 which discloses a collapsible carrier for camp packs as well as game having a single centrally located large diameter wheel and having removable handle bars which are storable within the collapsed assembly for enhanced portability. U.S. Pat. No. 4,444,405 illustrates a cart having one large centrally located wheel which has shock absorbing means as well as a mileage meter for use on rough terrain.

An important aspect of the present invention involves its use in connection with carrying game such as a deer or even larger game which has been killed in the woods and in such terrain as to be inaccessible by motorized vehicles. The task of removing large game from such terrain is generally a two-man job wherein each man carries one end of a horizontal pole from which the animal is suspended. Game carriers have been provided having some limited collapsibility but generally being of a type configured in such a manner as a hand cart with relatively larger wheels. Carts with a single wheel at one end as well as sleds have also been utilized for this purpose.

The devices of the prior art have been relatively ineffective in providing a practical means for transporting large game as a one man operation. The single wheeled devices are difficult to balance and are bulky when an attempt is made to carry them and are relatively of expensive construction. Such devices are generally incapable of utilization for any other purpose except transport of game or camping equipment. A more versatile device which is light and collapsible into a suitable package may be useful in lieu of the hand carts wherein wheels are fixed adjacent a lower corner, and wherein inexpensive means may be used for transporting loads such as layers of sod, sacks of grain, vegetables or construction materials including concrete blocks and the like.

The invention further contemplates provision of a removable brace for stabilizing the wheels and their mountings to facilitate transporting a load on the cart. Both rigid and flexible load bearing supports may be utilized and by removing the brace and providing a flexible support a recliner may be provided for the user such as a beach chair. Other beach equipment may be transported by the cart before its conversion as to a beach chair.

SUMMARY OF THE INVENTION

Accordingly, it is an important object of this invention to provide an assembly which is portable fitting into relatively close quarters and being light weight as may be readily assembled by one person for carrying game or other loads including camping equipment and the like.

Another object of the invention is to provide an all purpose cart which may be inexpensively manufactured and readily assembled and disassembled.

Another important object of the invention is to provide a collapsible cart constructed of light weight material preferably such as plastic or aluminum having a telescopic handle carried by a horizontal body having wheels carried by brackets for folding into side by side relation on the body and yet being adjustable for positioning in a generally central location in respect to the load in transversely aligned relation for bearing a load.

It has been found that a useful portable cart assembly may be provided utilizing light weight tubular structural members which may be round or square in cross-section for constructing a body having sides carrying a handle in telescopic relation thereto and which has wheel carrying brackets for longitudinal movement on the body and which are folded upwardly positioning the wheels in side by side relation for enhancing the portability of the assembly.

Another important object of the invention is the provision of a removable brace for stabilizing the wheels and their brackets during transporting of a load. A flexible or rigid support may be utilized for carrying a variety of loads without interfering with assembly and disassembly of the cart.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a perspective view illustrating a cart with the parts of the assembly positioned in operable position for carrying a load;

FIG. 2 is a sectional view taken on the line 2—2 in FIG. 1 illustrating fastening means for securing the respective brackets to the side frame members for positioning the wheels opposite each other and beneath a medial position of the load for maintaining the wheels in alignment without the necessity of using a transverse axle therebetween;

FIG. 3 is a sectional view taken on the line 3—3 in FIG. 1 illustrating fastening means for securing the handle in extended position as illustrated in FIG. 1;

DESCRIPTION OF THE PREFERRED EMBODIMENT

Figure 4:
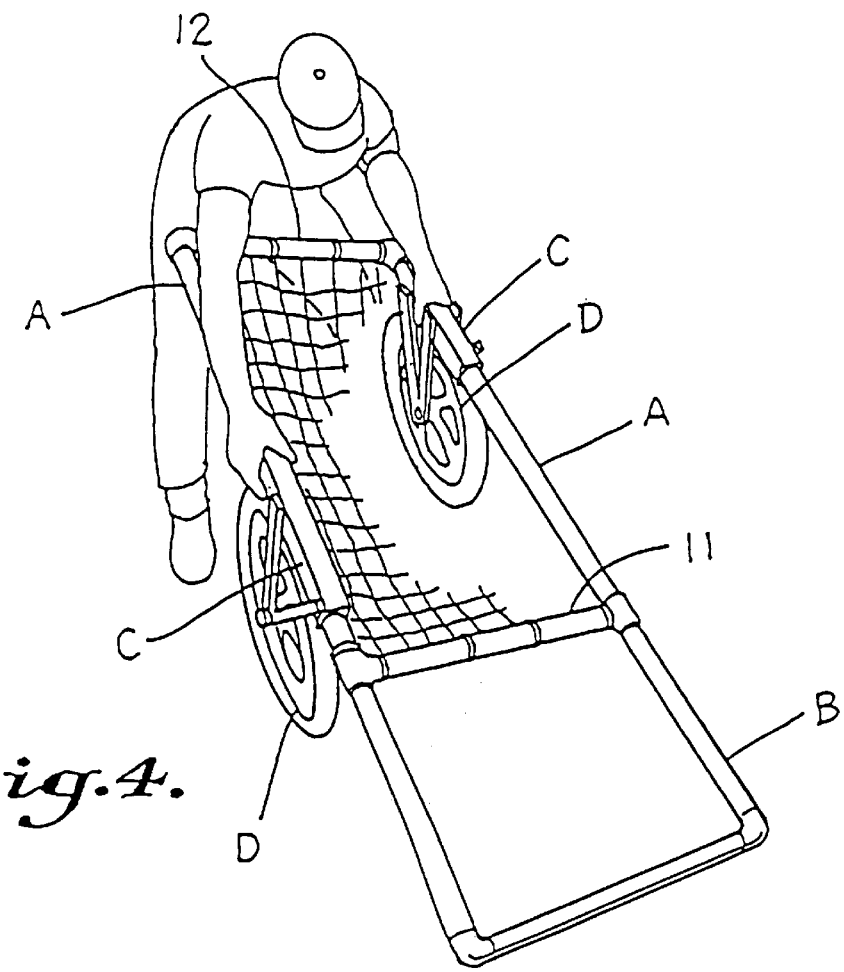
FIG. 4 is a perspective view illustrating the sliding of the wheel carrying brackets on the longitudinal frame members preparatory in maintaining them in a side by side relation as illustrated in FIG. 4.

A portable load bearing cart assembly has an elongated horizontal body including a pair of elongated longitudinal transversely aligned side members A constructed of tubular structural material. Open ends are presented by the side elongated longitudinal aligned members forming the body for receiving a handle B having elongated longitudinal aligned members free on one end carried in open ends presented by the elongated longitudinal members for sliding movement thereon. A pair of brackets C are slidable longitudinally and are rotatable on respective elongated longitudinal aligned members. A large diameter wheel D is carried by each bracket having a diameter comparable to the width of the cart. Fastening devices E position the brackets in a fixed intermediate position on respective elongated longitudinal aligned members opposite each other. Thus, the brackets and wheels maybe folded up adjacent the body in side by side relation with said handle telescoped inwardly of the body for portability and assembled with the handle extended and the wheels adjacent the center of a load.

Referring more particularly to FIG. 1, the cart assembly is illustrated with the parts assembled or positioned in such fashion as to carry large game such as a deer which is shown in broken lines as at 10 being carried upon the body A with the wheels D being carried thereon without the necessity of using a transverse axle connecting the wheels. The body includes the transverse aligned side members A as well as front and rear bridging members 11 and 12, respectively. A suitable platform, albeit flexible, is illustrated as including a net 13 suitably connected as by ties 14 to the respective bridging members 11 and 12. Any suitable platform may be employed including a panel, expanded metal, canvas, and the like. The frame and handle portions as well as the wheels and brackets constituting the cart are preferably constructed of plastic or light weight metal such as aluminum although any light weight structural material may be employed. The handle B is illustrated as having a pair of tubular members 15 and 16 which are parallel and transversely aligned and horizontally positioned for telescopic reception in the respective elongated transverse aligned side members A which have open ends illustrated at 17 and 18, respectively, for receiving the free ends of the handle members 15 and 16. The other end of the handle B is bridged as at 19.

The brackets C are best illustrated in FIG. 2 as having a square cross-section with opposed sides 20 and 21. The side member 21 is illustrated as carrying a bracket member 22 suitably fixed thereto for carrying a wheel. The brackets are rotatably mounted on the tubular side members A and upper and lower members 23 and 24 are provided between the sides for completing the bracket section and for carrying fastening devices E which include a pin 25 having a head 26 on one end and for receiving a suitable fastener such as a cotter pin 27 on the other end for securing the wheels D in adjusted downward position opposite each other on the body medially of the load and preferably of the body depending on the position of the load. The bracket members 22 are illustrated in FIG. 1 as being secured on one end to the bracket C and on the other end to respective stub shafts 28 for securing the respective large wheels in load carrying position as illustrated in FIG. 1.

Referring more particularly to FIG. 3, it will be observed that the handle members B are illustrated as being fixed with respect to the aligned side members A by means of a pin 30 having a head 31 and receiving a cotter pin 32 on the other end for maintaining the handle in extended position for transporting a load.

Figure 5:
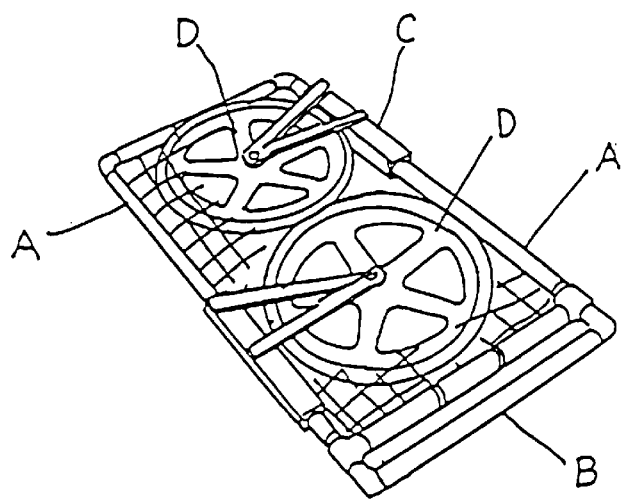
FIG. 5 is a perspective view illustrating the assembly in collapsed configuration with the wheels raised in side by side relation to facilitate storage and transport enhancing the portability of the apparatus.

Referring more particularly to FIG. 4, it will be noted that the respective brackets C are positioned in extreme forward and rear positions on respective transversely aligned side members A. In order to collapse the assembly to carrying position as illustrated in FIG. 4 the wheels and the brackets carried thereby are first removed to the forward and rear position described above. The fastening means E are removed to permit the sliding of the brackets C on the side members A but they may also be used to secure the brackets C in collapsed position as in FIG. 5. The handle B may be likewise secured in retracted position. The bracket and the wheels are then folded upwardly in order to rest in a side by side relation as illustrated in FIG. 4 within the horizontal body of the cart. Likewise the handle is telescoped inwardly after removing the pin 30 so as to collapse the assembly into a configuration which is easily handled and which may be fitted into a relatively small space such as the back seat of an automobile. The components are assembled in operable position as shown in FIG. 1 by extending and fixing the handle B and then aligning the brackets C and wheels carried thereby in load carrying position on an intermediate portion of the body for bearing a load substantially balanced thereon to facilitate transport of the load in generally horizontal position. Any suitable fastening means may include detents or spring loaded pins and the like.

Figure 6:
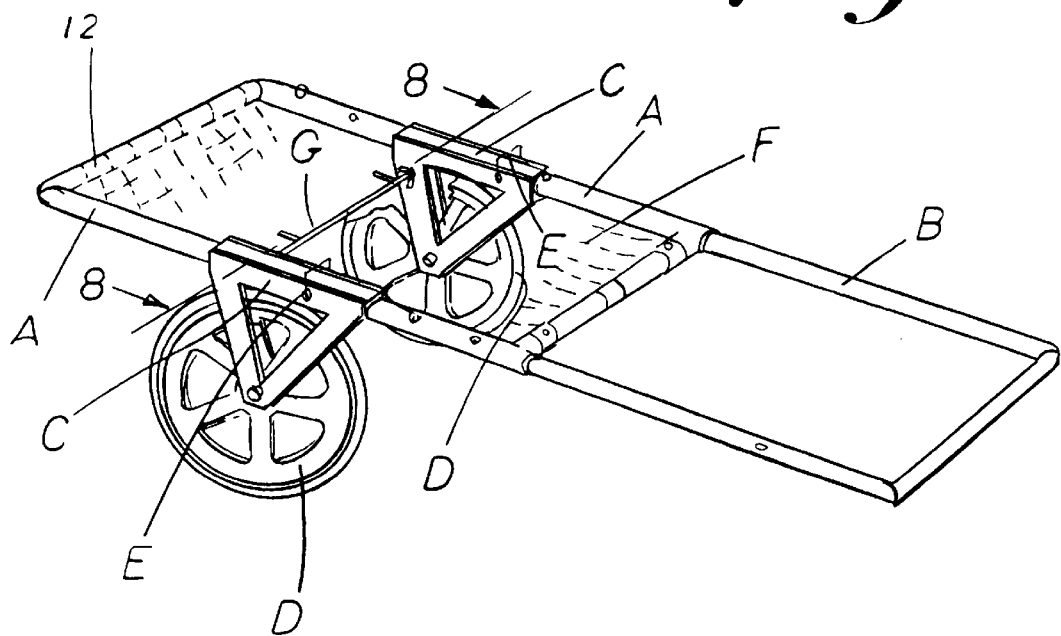
FIG. 6 is a perspective view illustrating the parts in assembled operating position with the transverse brace member positioned to exert a stabilizing force to the wheel brackets for facilitating transport of a load on the cart.
Figure 7:
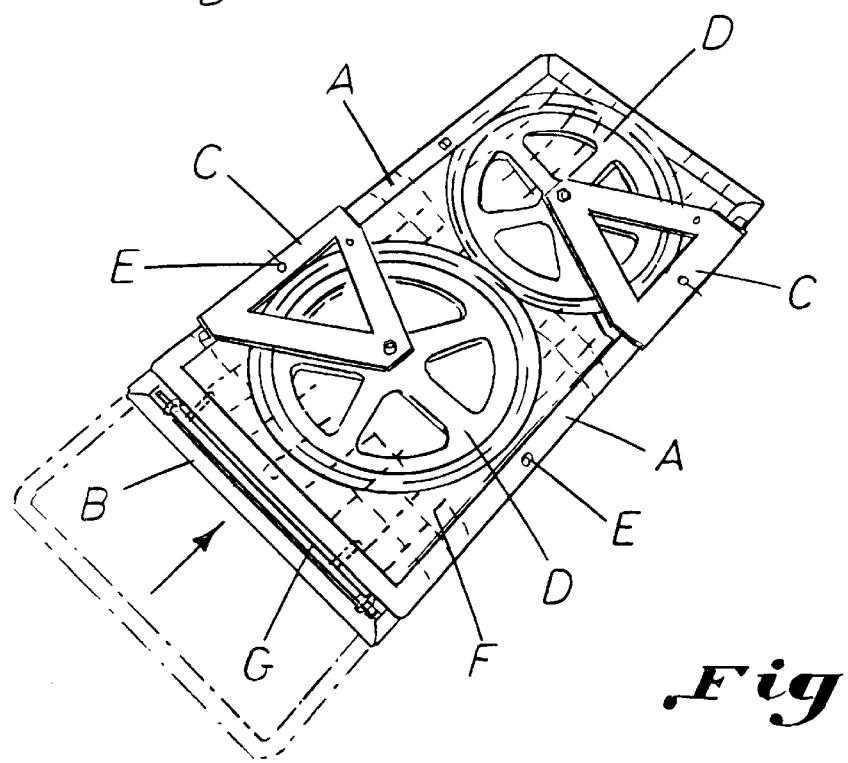
FIG. 7 is a perspective view illustrating the assembly in collapsed configuration similar to FIG. 5 but including the addition of a transverse brace for stabilizing the wheels and their brackets in operating position but carried on the horizontal frame A for transport in a collapsed condition.
Figure 8:
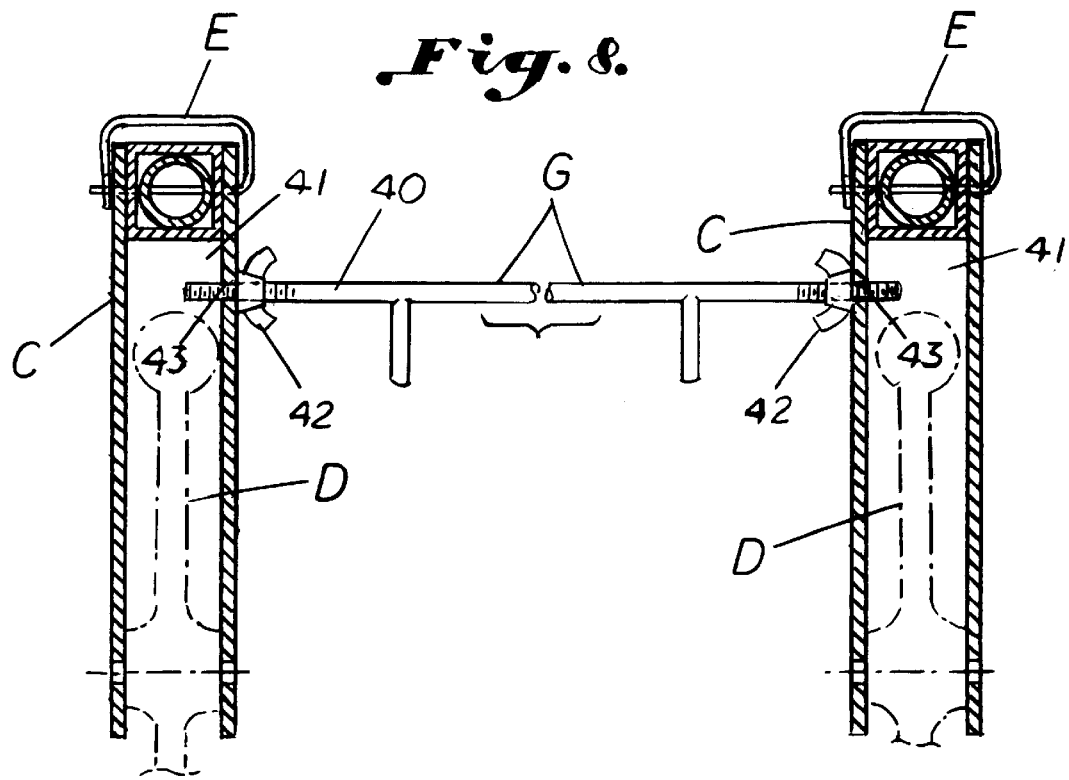
FIG. 8 is a sectional view on the line 8—8 in FIG. 6 at an enlarged scale illustrating details of the transverse brace and its mounting within opposed brackets.
Figure 9:
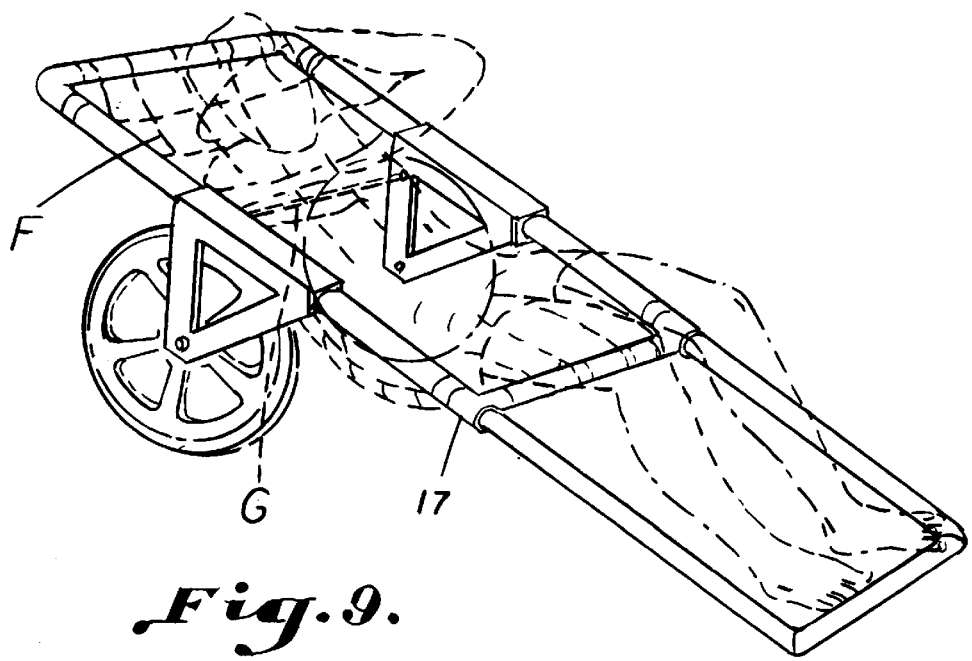
FIG. 9 is a perspective view illustrating the cart in an assembled condition with the brace removed and a flexible platform member provided for carrying a user in a reclining position such as one might be disposed on a beach chair.

FIGS. 6, 7 and 9 illustrate a transverse brace G which extends between the slidable brackets C when the wheels are in transverse alignment for adding rigid support to the wheel during use. The brace G is best illustrated in FIG. 8 as including a bar 40 having threaded ends 41 for carrying an internally threaded wing nut 42 at each end. The wing nuts may be threaded down to bear against an inner wall of each of the wheel supporting brackets so as to provide a compressive force urging brackets apart thus stabilizing the wheels and brackets for use in transporting a load. If desired the inner walls of the openings for receiving the threaded ends 41 may be threaded internally as illustrated at 43. In this case a tensile force may be exerted tending to pull the brackets inwardly for providing a stabilizing force.

FIG. 9 illustrates the use of a flexible platform or support F in the form of a net for supporting an individual in reclining position after the user has removed the transverse brace, which is illustrated by the dotted lines prior to removal.

Figure 10:
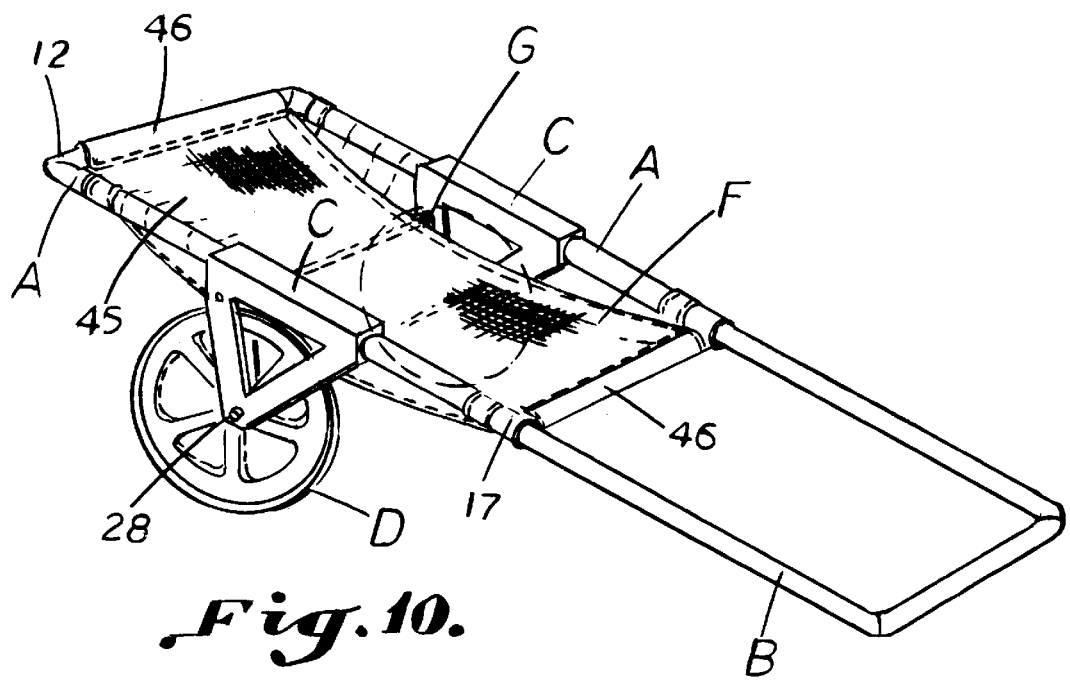
FIG. 10 is a perspective view illustrating the portable cart in assembled position with the longitudinal brace positioned for supporting the wheels and a flexible fabric platform member such a canvas as may be utilized for such purposes as the beach chair shown in FIG. 9.

FIG. 10 illustrates the use of a flexible platform such as canvas as illustrated as at 45. The canvas 45 has a loop 46 at its ends for positioning over a transverse members such as 11 and 12 between the aligned sides A for providing a horizontal body. By thus positioning the flexible support F there is no interference with sliding movement of the brackets on the longitudinal sides A.

Figure 11:
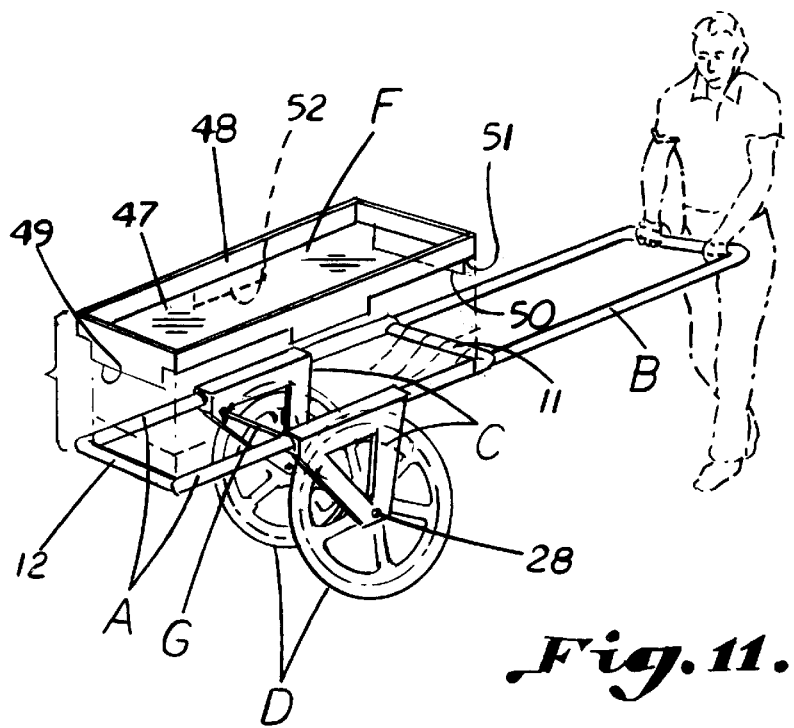
FIG. 11 is a perspective view illustrating the parts in assembled relation with the transverse brace in operable position and utilizing a rigid support carried by the body without interfering with movement of the brackets C on the longitudinal frame members A.

FIG. 11 illustrates a rigid including an imperforate support which has a rigid base 47. Other rigid bases may an expanded metal support in lieu of the imperforate support illustrated at 47. The rigid support including the rigid base illustrated at 47 includes sides 48 and an end member 49 for securement between the aligned sides A adjacent one end of the cart while a bracket 50 is carried at the other end and includes an offset portion 51 for support by an end frame member. Side supports 52 may be utilized to provide further stability for the rigid platform member.

While a preferred embodiment of the invention has been described using specific terms, such description is for illustrative purposes only, and it is to be understood that changes and variations may be made without departing from the spirit or scope of the following claims.

What is claimed is:

1. A portable load bearing cart assembly comprising:
   an elongated horizontal body having a pair of elongated longitudinal transversely aligned side members constructed of structural material;
   an elongated handle carried on said elongated horizontal body for longitudinal adjustment thereon;
   a pair of brackets each slidable longitudinally on respective elongated longitudinal aligned side members;
   a wheel carried for rotation by each bracket, being foldable on each bracket and having a diameter comparable to the width of the cart receivable adjacent said body when said brackets and wheels carried thereby are moved adjacent respective ends of said body;
   fastening devices positioning said brackets in a fixed intermediate position on respective elongated longitudinal aligned members opposite each other for bearing a load on said wheels;
   a longitudinal load bearing member extending across, along and affixed on said body adjacent respective ends of said body so as not to interfere with sliding adjustment and positioning of the brackets for receiving a load there across; and
   a disconnectable and removable brace connectable on each end to a respective bracket extending transversely across said body interconnecting and stabilizing said brackets and wheels;
   whereby said brackets and wheels may be folded up in longitudinal alignment adjacent said body with said handle carried in retracted position thereon for transport and assembled with the handle extended and with the wheels in an intermediate portion of the body tending to balance a load with the body in a generally horizontal position for transporting a load.

2. The portable cart set forth in claim 1 wherein respective ends of said brace are receivable in opposed openings in said brackets positioned outwardly of the wheels.

3. The portable cart set forth in claim 2 including fasteners adjacent to each end of said brace securable for exerting a stabilizing force between said brackets.

4. The portable cart set forth in claim 1 wherein respective ends of said brace are threaded and carry internally threaded nuts, said ends being receivable in opposed openings in said brackets.

5. The portable cart set forth in claim 1 wherein said brace is a bar having projections intermediate its ends for reception on said horizontal body positioning said brace for transport.

6. The portable cart set forth in claim 1 wherein said load bearing member is flexibly secured at each end to an end of said horizontal body between said aligned side members.

7. The portable cart set forth in claim 6 wherein said load bearing member is a net.

8. The portable cart set forth in claim 1 wherein said load bearing member is canvas.

9. The portable cart set forth in claim 1 wherein said load bearing member is a rigid platform removably secured at each end to an end of said horizontal body between said aligned members so as not to interfere with sliding of said brackets thereon.

10. The portable cart set forth in claim 1 wherein said load bearing member is a rigid platform secured at each end to an end of said horizontal body so as to be spaced from said aligned members so as not to interfere with sliding of said brackets thereon.

11. The method of assembling a portable load bearing cart comprising the steps of:
    providing an elongated horizontal body having a pair of elongated longitudinal transversely aligned side members constructed of structural material;
    extending an elongated handle carried by said elongated longitudinal body from a retracted position thereon;
    providing a pair of wheels carried by respective slidable brackets each wheel having a diameter comparable to the width of the cart receivable adjacent said body when said brackets and wheels carried thereby are positioned adjacent respective ends of said body;
    folding said wheels downwardly from a position adjacent the body;
    sliding each of said brackets longitudinally on respective elongated longitudinal transversely aligned side members toward a position in transverse alignment in an intermediate portion of said body, one of said brackets being moved toward the handle;
    locking said brackets in a fixed intermediate use position on respective elongated longitudinal aligned members, with said wheels down in transverse alignment opposite each other; and
    removably securing a transverse brace between said brackets stabilizing said brackets and wheels for transporting a load in said cart;
    whereby said brackets and wheels may be folded up adjacent said body with said handle carried in retracted position thereon for transport and assembled with the handle extended and with the wheels in an intermediate portion of the body tending to balance a load in substantially horizontal position during transport of the load.

12. The method of assembling a portable load bearing cart as set forth in claim 11 including the step of removing said transverse brace member; and utilizing a flexible support member for supporting a user in a reclining position as in a beach chair.

13. The method of assembling a portable load bearing cart as set forth in claim 11 including the step of adjusting the effective length of said brace to exert a stabilizing force between the brackets to facilitate transporting a load on said cart.

14. The method of assembling a portable load bearing cart as set forth in claim 13 including the step of exerting an outward stabilizing force tending to pivot said brackets outwardly.

\* \* \* \* \*